March 18, 1930. A. E. WILSON 1,751,019
APPARATUS FOR JOINTING LEAD OR LIKE PIPES OR SHEATHS
Filed Sept. 10, 1927
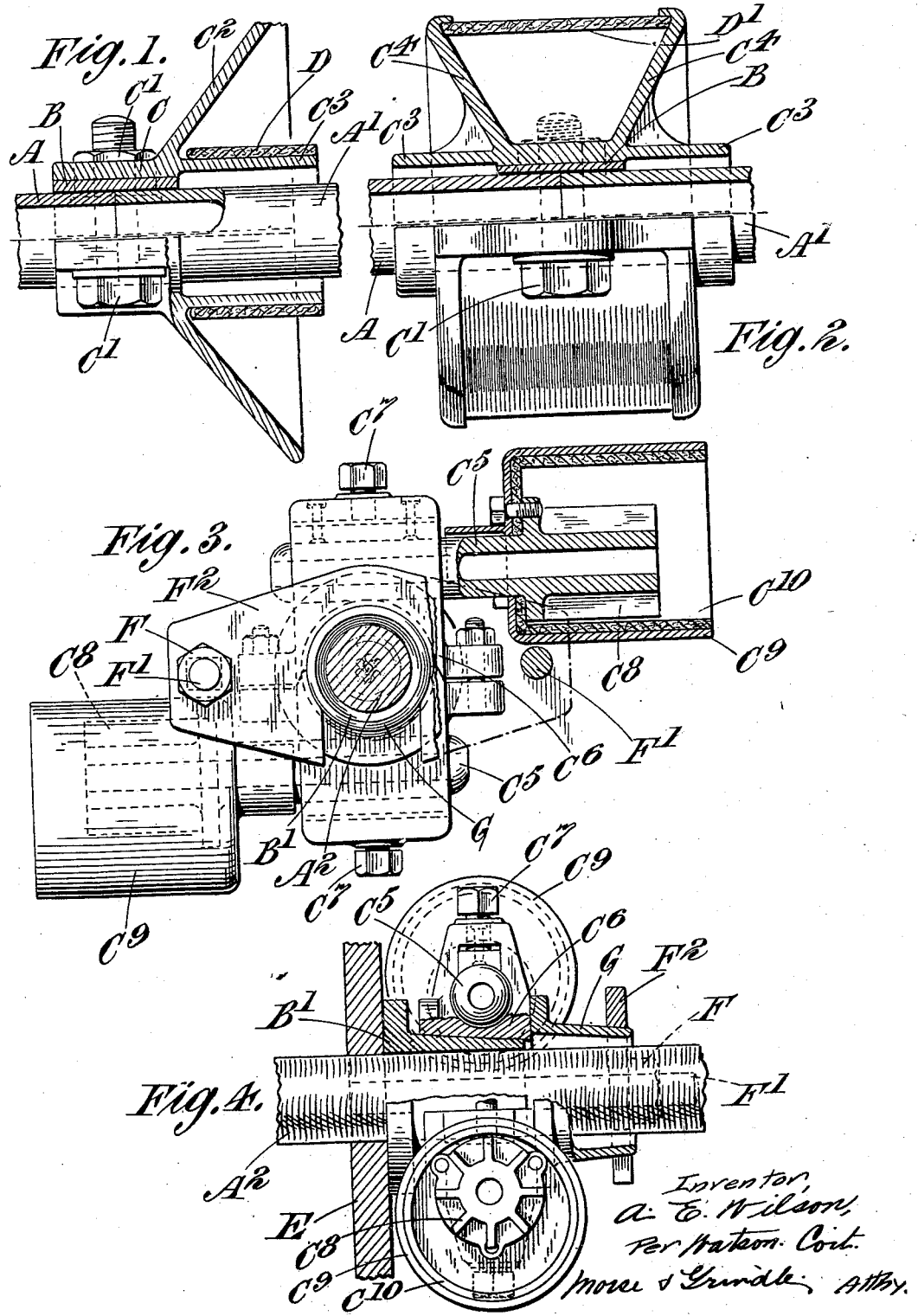

Patented Mar. 18, 1930

1,751,019

UNITED STATES PATENT OFFICE

ALFRED EDGAR WILSON, OF BROMLEY, ENGLAND

APPARATUS FOR JOINTING LEAD OR LIKE PIPES OR SHEATHS

Application filed September 10, 1927, Serial No. 218,728, and in Great Britain October 23, 1926.

This invention relates to apparatus for jointing lead or like pipes or sheaths and more particularly to apparatus for making such joints by the application of heat and pressure applied to a sleeve either made of readily fusible metal or lined therewith and placed round the joint. Joints of this general type are known in themselves and electrically heated clamps are sometimes used for making them.

Whilst electrically heated apparatus is most suitable for use in certain circumstances, it is sometimes inconvenient to employ it, and the present invention has for its object the provision of means whereby joints of the kind referred to can be made readily by the heat from a blow-lamp or like flame.

In making joints according to this invention a clamp is employed having one or more members serving to conduct the heat from a blow-lamp or like flame to the parts immediately adjacent to the joint and to shield the neighbouring portions of the pipe or sheath.

In one construction the clamp is provided with a projection or fin of metal so shaped that a blow-lamp flame can be readily applied to it without risk of heating unduly the neighbouring portions of the pipe or sheath. The clamp is divided longitudinally into two or more parts so that it can be placed round the sleeve or gland over the joint and the fin or projection may, when the clamp is in position, be conical or funnel-shaped and extend round the pipe at an appropriate angle thereto.

Conveniently a definite shield is provided to protect the portion of the pipe or sheath within this conical fin and such shield may be in the form of a tubular extension of the clamp of sufficient diameter to be separated from the pipe or sheath which it surrounds by an air space. This annular shield may be partly or wholly formed of, or may be covered by, asbestos or other heat insulating substance.

In some constructions the projection or fin may form one side or wall of an annular chamber surrounding the clamp and acting to conserve the heat around the portion of the clamp immediately adjacent to the joint. This chamber may be closed by a surrounding wall of asbestos.

In another construction, also according to this invention, the member to which the heating flame is applied is in the form of a tubular chamber contained within the clamp and having a funnel-shaped mouth projecting from the side of the clamp. Into this chamber the flame is directed and the mouth is preferably lined or covered with asbestos to act as a shield. This tubular chamber may be lined with fire-clay or other refractory material to prevent deterioration of the metal.

The clamp may be provided with any desired number of these tubular chambers but when the clamp is in two parts each part preferably has one such chamber.

The chamber may be formed integral with the clamp, i. e. may consist of a bore or cavity in it or may be a separate tube clamped or otherwise held in a hole or recess in the clamp. An advantage of such a separate tube is that it may be made interchangeable with an electric heating element so that the same jointing apparatus may be used either for electric or flame heating.

By the use of a clamp according to this invention the heat from the blow-lamp flame is conducted to the point where it is needed for making a joint and prevented from unnecessarily heating other parts of the pipe. Further, the conducting and radiating surfaces of the clamp may be so proportioned as to ensure that the transference of heat has the desired effect which is the proper amalgamation of the fusible lining of the sleeve with the exterior of the pipe so that a solid joint capable of withstanding considerable internal pressure is made. Such effect would not be obtained with certainty by allowing a blow-lamp flame to be directed on to a clamp not provided with a definite heating member.

Pressure may be applied to the heated clamp in any convenient way, for instance by screws or bolts tending to force the two parts of the clamp on to the inner sleeve, or again the exterior face of the sleeve may be conical and the interior faces of the clamp similarly shaped so that the pressure may be applied by bolts or studs tending to move the clamp longitudinally over the sleeve. Such a construction is convenient for making joints between the glands and the lead sheathing of electric cables.

In the accompanying drawings—

Figures 1 and 2 are part sectional elevations of two simple forms of clamps according to this invention;

Figure 3 is an end view partly in section of another construction of clamp also according to this invention, and Figure 4 is a view partly in section taken at right angles to Figure 3.

With reference first to Figure 1 the pipes or sheaths to be joined are indicated at A and $A^1$ and the sleeve which is to make the joint over their ends is shown at B. The heating clamp C is in two parts clamped round the sleeve B by nuts and bolts $C^1$. The clamp has a projecting member or fin $C^2$ and a tubular extension $C^3$ covered with asbestos at D. This tubular extension forms a shield to protect the adjacent portion of the pipe $A^1$ from the heat of a blow-lamp flame applied to the fin $C^2$, and it is of sufficient internal diameter to leave an air space between it and the pipe $A^1$.

The heat from the flame applied to the fin $C^2$ is conducted to the clamp proper and through it to the sleeve B which is of readily fusible metal or lined therewith. When the temperature is sufficiently high the joint is completed by exerting pressure on to the sleeve through the clamp by means of the nuts and bolts.

In the construction shown in Figure 2 there are two circular projections or fins $C^4$ and the space between them is closed in by a surrounding wall of asbestos $D^1$ to form a chamber which conserves the heat around the portion of the clamp immediately adjacent to the sleeve B. In this figure the pipes and other parts similar to corresponding parts shown in Figure 1 are similarly lettered.

In the construction shown in Figures 3 and 4 the members to which the heating flame is applied are separable from the clamp. Each heating member comprises a tubular stem $C^5$ which may be made of some metal such as copper, being a good conductor of heat, and is adapted to be firmly held in a hole in the clamp $C^6$ by studs $C^7$. Each of these stems $C^5$ has a head with radial fins $C^8$ enclosed in a funnel-like chamber $C^9$ lined with asbestos as at $C^{10}$. There are two of these heating elements one on each side of the clamp, and the heating flame is applied to the heads $C^8$ within the mouth or funnel $C^9$.

By way of illustration of one of its uses this clamp is shown as being applied to a gland $B^1$ which is to be jointed to the lead sheathing $A^2$ of a cable where it enters a junction box the wall of which is indicated at E. The outside of this gland $B^1$ is tapered and the internal surfaces of the clamp $C^6$ are correspondingly shaped so that the necessary pressure may be applied to the gland by tightening up nuts F on bolts or studs $F^1$ which are secured to the junction box. The pressure of the nuts F is exerted through a yoke plate $F^2$ and a tapered sleeve G the inner end of which presses against the clamp $C^6$.

As shown the internal taper of this sleeve G corresponds with the external taper of the gland $B^1$ and thus, when the joint is finished, the clamp may be removed and the sleeve G, plate $F^2$ and nuts and studs F $F^1$ used to keep the gland $B^1$ pressed tightly against the wall of the junction box.

By having the heaters $C^5$ $C^8$ separate from the clamp they can be used interchangeably with electrically heated elements of known type having stems of dimensions similar to those of the stems $C^5$.

What I claim as my invention and desire to secure by Letters Patent is:—

1. In apparatus for use in jointing lead or like pipes or sheaths, the combination of a clamp adapted to apply heat and pressure to a sleeve round the joint and having a hole or recess, a metal heating member having a stem fitting into said hole, and a funnel-like mouth or chamber round said member into which chamber a flame can be directed.

2. In apparatus for use in jointing lead or like pipes or sheaths, the combination of a clamp adapted to apply heat and pressure to a sleeve round the joint and having a hole or recess, a metal heating member, a stem forming part of said heating member and fitting into said hole, a head to said member, fins on said head, and a chamber round said head into which a flame can be directed on to the head.

3. In apparatus for use in jointing lead or like pipes or sheaths, the combination of a clamp adapted to apply heat and pressure to a sleeve round the joint and having a hole or recess, a metal heating member, a stem forming part of said heating member and fitting into said hole, a head to said member, fins on said head, a chamber round said head into which a flame can be directed on to the head, and a lining of heat-resisting material in said chamber.

In testimony whereof I have signed my name to this specification.

ALFRED EDGAR WILSON.